United States Patent
Larsson et al.

(10) Patent No.: US 10,045,392 B2
(45) Date of Patent: *Aug. 7, 2018

(54) SIGNALING FOR FLEXIBLE CARRIER AGGREGATION

(71) Applicant: TELEFONAKTIEBOLAGET L M ERICSSON (PUBL), Stockholm (SE)

(72) Inventors: Magnus Larsson, Sollentuna (SE); Muhammad Kazmi, Sundbyberg (SE); Christian Bergljung, Lund (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,043

(22) Filed: Jan. 30, 2017

(65) Prior Publication Data
US 2017/0142771 A1   May 18, 2017

Related U.S. Application Data

(63) Continuation of application No. 12/873,817, filed on Sep. 1, 2010, now Pat. No. 9,559,829.
(Continued)

(51) Int. Cl.
*H04W 48/10* (2009.01)
*H04W 76/15* (2018.01)
*H04L 5/00* (2006.01)

(52) U.S. Cl.
CPC ............ *H04W 76/15* (2018.02); *H04L 5/001* (2013.01); *H04L 5/0096* (2013.01);
(Continued)

(58) Field of Classification Search
CPC .. H04L 12/5695; H04L 47/828; H04L 5/0048
See application file for complete search history.

(56) References Cited

U.S. PATENT DOCUMENTS

2004/0228283 A1* 11/2004 Naguib ................. H04L 5/0044
370/252
2006/0221894 A1* 10/2006 Casaccia .............. H04B 7/0871
370/328
(Continued)

FOREIGN PATENT DOCUMENTS

WO   WO 2008/115837 A1   9/2008

OTHER PUBLICATIONS

Notification of Transmittal of International Search Report and Written Opinion of the International Searching Authority, dated May 9, 2011 in corresponding Application No. PCT/IB2010/055000.
(Continued)

*Primary Examiner* — Romani Ohri
(74) *Attorney, Agent, or Firm* — Sage Patent Group

(57) ABSTRACT

Flexible carrier aggregation is provided for a radio communications system. A capability is determined to communicate over a radio interface using multiple radio frequency component carriers. Each of the multiple component carriers is configurable with one or more control channels in a first mode of operation and with no control channels in a second mode of operation. Configuration information for one of the multiple radio frequency component carriers is signaled to indicate at least one of the component carriers is configured to operate in a selected one of the first mode of operation and the second mode of operation so that a network radio node and a user equipment radio node can communicate using the selected mode of operation.

6 Claims, 4 Drawing Sheets

Related U.S. Application Data

(60) Provisional application No. 61/257,935, filed on Nov. 4, 2009.

(52) U.S. Cl.
CPC ........... *H04W 48/10* (2013.01); *H04L 5/0053* (2013.01); *H04L 5/0094* (2013.01); *H05K 999/99* (2013.01)

(56) References Cited

U.S. PATENT DOCUMENTS

| | | | | |
|---|---|---|---|---|
| 2009/0274077 | A1* | 11/2009 | Meylan | H04W 28/06 370/280 |
| 2010/0240372 | A1* | 9/2010 | Wu | H04W 76/025 455/436 |
| 2011/0177807 | A1* | 7/2011 | Cho | H04W 56/00 455/422.1 |
| 2012/0122455 | A1* | 5/2012 | Frenger | H04L 5/0037 455/436 |
| 2012/0183087 | A1* | 7/2012 | Bi | H04L 5/0007 375/260 |

OTHER PUBLICATIONS

Panasonic: "Component Carrier Operation without PDCCH", 3GPP Draft; R1-093598 (update of R1-093466) $3^{rd}$ Generation Partnership Project (3GPP), Mobile Competence Centre, Aug. 24, 2009, XP050388169.

Alcatel-Lucent et al; "Component Carrier Types in LTE-A"3GPP Draft; R1-093764, $3^{rd}$ Generation Partnership Project (3GPP), Mobile Competence Centre, Oct. 12, 2009, XP050388285.

NEC: "Mobility and Carrier Aggregation Signaling", 3GPP; R2-095949, $3^{rd}$ Generation Partnership Project (3GPP), Mobile Competence Centre, Oct. 12, 2009, XP050390384.

Panasonic: "Component Carrier Types in LTE-A", 3GPP Draft; R2-095312_Component_Carrier_Types, $3^{rd}$ Generation Partnership Project (3GPP), Mobile Comptence Centre, Aug. 24, 2009.

International Preliminary Report on Patentability, dated May 8, 2012, in International Application No. PCT/IB2010/055000.

Japanese Office Action dated Apr. 3, 2014 in Japanese Application No. 2012-537474.

3GPP TSG-RAN1 #56bis, Anchor Component Carrier and Preferred Control Signal Structure, Seoul Jan. 23-27, 2009, R1-091503.

3GPP TSG-RAN WG1 Meeting #58, Component Carrier Operation without PDCCH, Aug. 24-28, 2009; R1-093598 (R1-093466).

\* cited by examiner

SIGNALING FOR FLEXIBLE CARRIER AGGREGATION

TECHNICAL FIELD

The technology pertains to telecommunications, and more particularly, to carrier aggregation.

BACKGROUND

In a typical cellular radio system, radio or wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UNITS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UEs) within range of the base stations.

The Universal Mobile Telecommunications System (UMTS) is a third generation mobile communication system, which evolved from the Global System for Mobile Communications (GSM). UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. The first release for the Evolved Universal Terrestrial Radio Access Network (E-UTRAN) specification has issued, and as with most specifications, the standard will likely evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network (via Access Gateways (AGWs)) rather than to radio network controller (RNC) nodes. In general, the functions of a radio network controller (RNC) node are distributed between the radio base stations nodes (eNodeB's in LTE) and AGWs. As such, the radio access network (RAN) of an LTE system has what is sometimes termed a "flat" architecture including radio base station nodes without reporting to radio network controller (RNC) nodes.

A key feature of long term evolution advanced (LTE-A) is achieving higher data rates by allowing a user equipment to receive and transmit data on multiple LTE component carriers simultaneously in both uplink and downlink directions, which is referred to as "carrier aggregation."

In legacy LTE release-8, the UE receives and transmits using a single carrier frequency. To limit UE and base station complexity, the radio and performance requirements are specified for a limited number of channel bandwidths: 1.4 MHz, 3 MHz, 5 MHz, 10 MHz, 15 MHz, and 20 MHz. The legacy LTE release-8 UE supports transmission and reception up to 20 MHz of channel bandwidth. In LTE, orthogonal frequency division multiple access (OFDMA) and single carrier-frequency division multiple access (SC-FDMA) are used as access technologies in the downlink and uplink, respectively. Therefore, the physical radio communication resources are expressed in terms of "resource blocks," both in the downlink and the uplink. A resource block is a time-frequency resource comprising of one time slot (0.5 ms) in time and 180 KHz or 12 sub-carriers (1 sub-carrier carrier spacing=15 KHz) in frequency. Each legacy LTE release-8 channel bandwidth contains certain number of resource blocks. For instance, a 20 MHz carrier frequency can theoretically accommodate 110 resource blocks. But in order to meet various practical radio requirements, (e.g., modulation quality, spectrum emission mask, etc.), a guard band is required on each flank of the carrier frequency. For example, in order to fulfill at least one example set of radio requirements, only 100 resource blocks are transmitted in both the uplink and the downlink for a 20 MHz carrier frequency.

Carrier aggregation is described at a general level in the feasibility study for 3GPP LTE release-10, i.e., LTE-Advanced (LTE-A) at 3GPP TR 36.815 V9.1.0 (2010-06) available at the 3GPP website www.3gpp.org. Carrier aggregation means that two or more "component carriers" are aggregated in order to support wider bandwidths. Each carrier frequency is referred to as a component carrier. A goal is to aggregate a different number of component carriers of possibly different bandwidths in the UL and the DL. FIG. 1A illustrates an example of aggregated bandwidth of 90 MHz made up of four 20 MHz component carriers and one 10 MHz component carrier, which are all contiguous. FIG. 1B illustrates an example of aggregated bandwidth of 20 MHz made up of four 5 MHz component carriers, two of which are not contiguous and two of which are contiguous.

Carrier aggregation allows a UE to simultaneously receive and/or transmit data over more than one carrier frequency thereby enabling a significant increase in data reception and/or transmission rates. For instance, 2×20 MHz aggregated carriers theoretically provide a two-fold increase in data rate as compared to the data rate for a single 20 MHz carrier. As shown in the examples in FIGS. 1A and 1B, a component carrier may be contiguous or non-contiguous. Non-contiguous carriers may belong to the same frequency band or to different frequency bands. Aggregated bandwidths of up to 100 MHz using up to 5 component carriers are being considered. A hybrid carrier aggregation scheme with contiguous and non-contiguous component carriers is also contemplated for LTE-advanced.

Implementation of the above contiguous carrier aggregation scenarios requires that a network operator own a very large contiguous frequency band, e.g., 80-100 MHz in the same band. But presently, large contiguous frequency allocations, e.g., on the order of 80-100 MHz, either do not exist or may be difficult to acquire in the future. One way to allow an operator to efficiently use larger chunk of available spectrum is to employ an extension carrier or segment which is generally a smaller carrier compared to other component carriers and can be used by an operator to "fill in" the available spectrum.

To illustrate this point, consider an example in which contiguous 80 MHz spectrum is available. An operator can use 4×20 MHz carriers, each with 100 resource blocks (RBs). This configuration maintains backward compatibility with the legacy LTE-release 8 20 MHz carrier in terms of resource blocks (there are 100 resource blocks per 20 MHz in legacy LTE-release 8). A small portion of spectrum of about 6 MHz (which is less than the 20 MHz legacy spectrum) remains unused as now explained. The 20 MHz carrier has a channel bandwidth of 20 MHz, but a transmission bandwidth of 18 MHz for the 100 RBs because there is 1+1 MHz of guard band inside the channel bandwidth, namely, 1 MHz at each end of the 18 MHz. This means that a densely-packed system for LTE-A of 4×20 MHz uses 4×18 MHz=72 MHz out of the 80 MHz to actually carry resource blocks. In other words, the 4×20 MHz carriers use up all of the available spectrum if the four carriers are configured as: (1+18+1)+(1+18+1)+(1+18+1)+(1+18+1). But if instead the four carriers were configured as: (1+18+18+18+18+1) without the 6 intervening guard bands, that provides room for 6 MHz for additional extension carriers. If a 5 MHz extension carrier is added onto 4×20 MHz carriers, then the available 80 MHz can be more efficiently used. Specifically, if the 25 RBs=4.5 MHz are packed next to the 4×18 MHz=4×100 RB=4×100*0.18 MHz, then the result is 1+4×18+4.5+1=78.5 MHz. So even though a guard band of small unused spectrum at the edges of the aggregated carriers must be maintained to meet practical radio requirements, which means 100% spectrum utilization is not practically possible, introduction of an extension carrier can significantly improve the spectral efficiency.

One approach for implementing carrier aggregation in LTE-advanced (LTE-A) is to make the extension carrier backward-compatible to legacy LTE-8 carriers, which means all control channels normally found in the LTE-8 carrier are also found in the extension carrier. An alternate approach that is not backward-compatible to LTE-8 carriers uses an extension carrier with only data resource blocks and no control channels. But this static design choice deprives the operator of flexibility to selectively choose an approach that best suits a current network need or situation. In other words, when configuring new spectrum for LTE-A carrier aggregation, the operator either selects a component carrier design that is an LTE backwards compatible component carrier but which suffers a user data inefficiency due to signaling channel overhead associated with that backwards compatibility, or an LTE-10 extension carrier, which is efficient because there is no signaling overhead, but which is not backwards compatible to earlier LTE releases.

What is needed is flexibility to be able to selectively and dynamically implement either approach including one with one or more extension carriers with control channels and another where extension carriers are configured without control channels. Another need is a signaling mechanism to support such flexible carrier aggregation.

SUMMARY

Flexible carrier aggregation is provided for a radio communications system. A capability is determined to communicate over a radio interface using multiple radio frequency component carriers. Each of the multiple component carriers is configurable with one or more control channels in a first mode of operation and with no control channels in a second mode of operation. Configuration information for one of the multiple radio frequency component carriers is signaled to indicate at least one of the component carriers is configured to operate in a selected one of the first mode of operation and the second mode of operation so that a network radio node and a user equipment radio node can communicate using the selected mode of operation.

The signaling may include signaling from the radio network node to the user equipment indicating whether the radio network node is transmitting to the user equipment with the one component carrier configured with the one or more control channels or with no control channels. The signaling may for example be communicated to the user equipment using a broadcast message or by a user equipment-specific message. In addition, the signaling can also include signaling from the radio network node to one or more other radio network nodes, e.g., in order to coordinate a handover of a user equipment connection from the radio network node to one of the other radio network nodes that can support the selected mode of operation for the connection.

In one non-limiting embodiment, one or more parameters is determined that affect communication over a radio interface using multiple radio frequency component carriers between the network radio node and the user equipment radio node. One of the first mode of operation and the second mode of operation is selected based on the determined one or more parameters. The one or more parameters may include for example a traffic load of user equipments that can only operate in the first mode of operation being served by the radio network node, user equipment (UE) capability indicating the UE's supported mode of operation(s), and/or a total available bandwidth associated with the radio network node.

A configuration of each the multiple component carriers may be determined based on a bandwidth of each of the multiple component carriers. A first component carrier having a bandwidth greater than a predetermined value is configured with one or more control channels and a second component carrier having a bandwidth less than the predetermined value may be selectively configured with one or more control channels or with no control channels. The configuration for each of the multiple component carriers is preferably independent of the configuration of the others of the multiple component carriers.

In one non-limiting example implementation, the radio network node is a radio base station, and an operational network node signals the configuration information to the radio base station. The radio base station determines whether to transmit the configuration information to the user equipment using the one component carrier with one or more control channels in a first mode of operation and with no control channels in a second mode of operation and then signals the configuration information to the user equipment. The radio base station may for example make the determination based on one or more of the following: a number of legacy user terminals that can only operate in the first mode of operation, a priority of the legacy users, or a capability of user terminals being served by the radio network node.

In another non-limiting example, each of the multiple component carriers is configurable in the first mode of operation with first number of control channels and in another mode of operation with another number of control channels less than the first number.

An advantageous but non-limiting application is to an LTE system. Each of the multiple component carriers configurable with one or more control channels in the first mode of operation is an LTE release 8 or earlier carrier. Each of the multiple component carriers configurable with no control channels in a second mode of operation is an LTE release 10 or later carrier.

Another aspect of the technology relates to an operational node for a radio network that employs flexible carrier aggregation. The operational node includes a user interface configured to receive information regarding a capability for a base station to communicate over a radio interface using multiple radio frequency component carriers, each of the multiple component carriers being configurable with one or more control channels in a first mode of operation and with no control channels in a second mode of operation. Electronic circuitry in the operational node is configured to signal configuration information to the base station for one of the multiple radio frequency component carriers indicating that at least one of the component carriers is configured to operate in a selected one of the first mode of operation and the second mode of operation so that a network radio node and a user equipment radio node can communicate using the selected mode of operation. The operational node may be for example an Operating and Support System (OSS) or operation and maintenance (OAM) node, a self organizing network (SON) node, or a radio network node such as a radio base station.

Another aspect of the technology relates to a radio terminal for a radio communications network that employs flexible carrier aggregation. The terminal includes radio circuitry configured to receive information sent by a base station including a configuration of one or more of multiple radio frequency component carriers being used by the base station to communicate information with the radio terminal. Each of the multiple component carriers is configurable with one or more control channels in a first mode of operation and with no control channels in a second mode of operation. Electronic circuitry in the terminal is configured to determine the configuration of at least one of the multiple radio frequency component carriers being used by the base station to communicate information with the radio terminal. If the configuration is for the first mode of operation for the one component carrier, the circuitry prohibits the radio circuitry from transmitting on resource blocks for the one component carrier corresponding to a control channel. If the configuration is for the second mode of operation for the one component carrier, the electronic circuitry permits the radio circuitry to transmit on all resource blocks for the one component carrier.

DETAILED DESCRIPTION

Figure 1A:
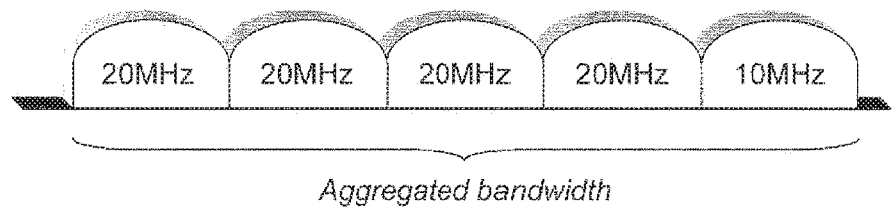
FIGS. 1A and 1B illustrate aggregated carrier examples.
Figure 1B:
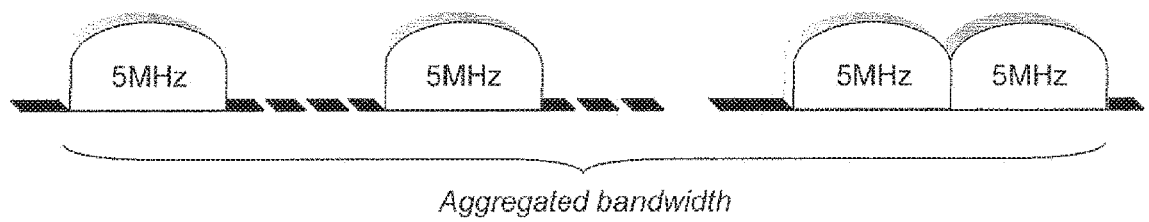

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its spirit and scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors and/or controllers, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

The technology in this application provides flexible carrier aggregation. Although the technology may be applied to any communications system that can support and benefit from carrier aggregation, the non-limiting LTE example from the background section is used for purposes of illustration. In the context of that non-limiting example, the technology permits a component carrier in LTE-10 to be configured as an LTE-8 component carrier (i.e., with all control channels) or an LTE-10 extension carrier (i.e., with no or less than all control channels used in LTE-8).

Figure 2:
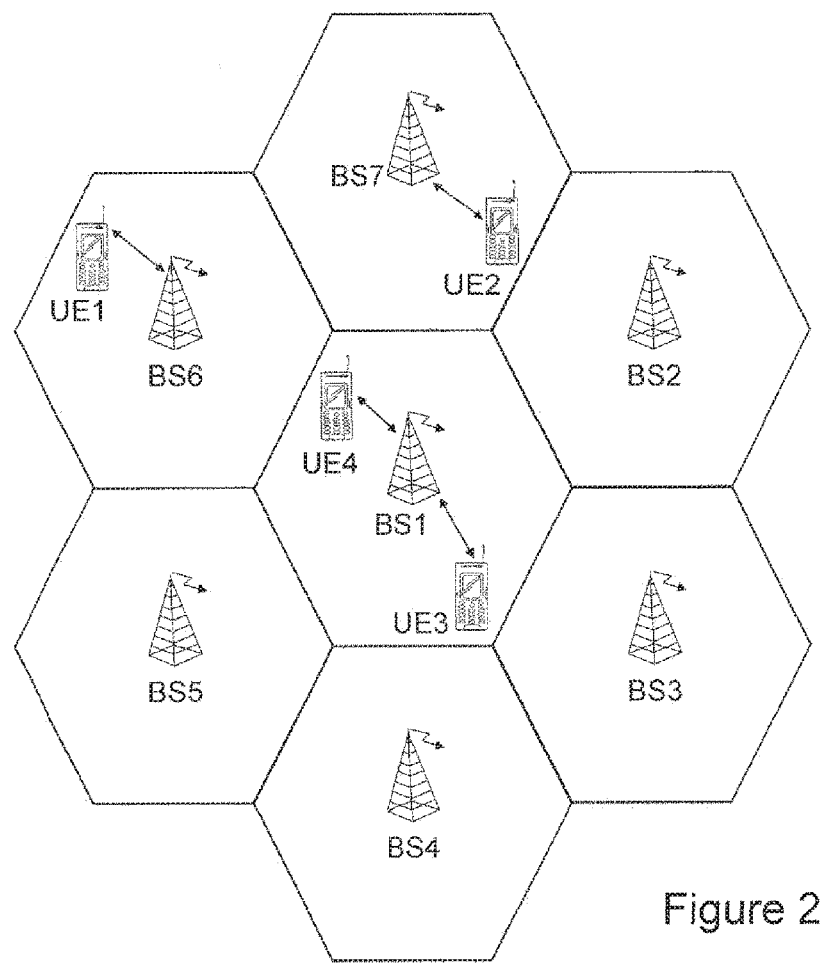
FIG. 2 is a diagram illustrating an example of a cellular radio communications system.

FIG. 2 is a diagram illustrating an example of a cellular radio communications system in which flexible carrier aggregation may be used. The communications network includes representative user terminals UE1-UE4 and base stations BS1-BS7. The user terminals UE1-UE4 comprise the functionality of a user terminal for transmission and reception in a communication network, an LTE-Advanced network in the non-limiting example. At least one of the user terminals UE1-UE4 can interpret messages for allocation of resources to the user terminal differently dependent on the mode, e.g., legacy mode or LTE-A mode, in which the user terminal is operating. The base stations BS1-BS7 serve corresponding cells and provide the user terminals UE1-UE4 access to the communications network. Each base station can send resource allocation messages to the user terminals in accordance with a legacy standard release mode and a new standard release mode that supports carrier aggregation. As explained earlier, frequency band used for radio transmission is typically called a carrier, and in carrier aggregation, the downlink transmission and/or the uplink transmission to and/or from a user terminal may occur over multiple consecutive/contiguous or non-consecutive/non-contiguous carriers called component carriers.

The mapping of transport blocks TB1, TB2 on resource blocks on different component carriers may be performed in base stations, called enhanced NodeBs (eNBs) in LTE or LTE-A. In LTE-A, the intent is to permit more than one transport block transmitted in the same time interval. Initially, channel coding and rate matching of data is performed for each transport block followed by modulation of the data for each transport block. In other words, there is a specific modulation and coding scheme (MCS) for each transport block. Each processed (MCS'ed) transport block is then mapped onto multiple component carriers, e.g., CC1-CC5. Each component carrier carrying data from multiple transport blocks is transmitted over the air interface.

Figure 4:
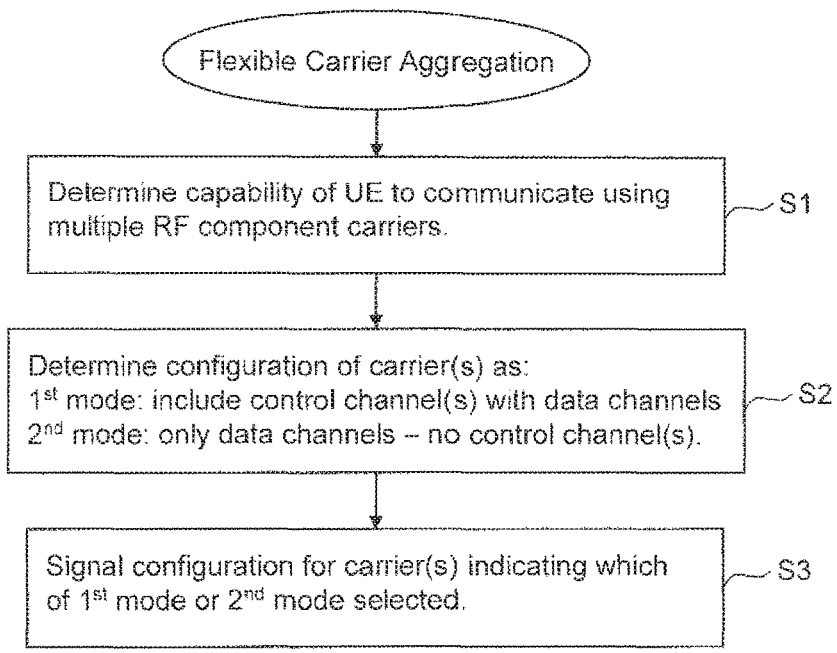
FIG. 4 is a flowchart illustrating non-limiting, example procedures for flexible carrier aggregation.

FIG. 4 is a flowchart illustrating non-limiting, example procedures for flexible carrier aggregation. In step S1, a capability (typically of one or more UEs but the determination could also include one or more base stations) to communicate over a radio interface using multiple radio frequency component carriers is determined. A configuration of each carrier is determined in step S2 with a first mode of operation having the carrier include or carry one or more control channels and a second mode of operation having the carrier not include or carry any control channel. There may be an alternative second mode of operation or an additional third mode of operation where the carrier is configured to include or carry a limited number of control channel(s), where the limited number is less than the number of control channels included or carried in the first mode of operation. In step S3, configuration information is signaled for at least one of the multiple radio frequency component carriers indicating at least one of the component carriers is configured to operate in a selected one of the first mode of operation and the second mode of operation so that a network radio node and a user equipment radio node can communicate using the selected mode of operation. The signaling may be performed by any appropriate node using any appropriate signaling technique and protocol.

A signaling mechanism is provided between network nodes and over the radio interface between network nodes and UEs to allow configuration of one or more component carriers, which may be but not necessarily one or more smaller extension carriers, in a set of aggregated component carriers in two or more of the following modes of operations: with all legacy control channels (first mode), without any control channels (second mode), and with only a limited number (less than all) of legacy control channels (alternative second mode or third mode). One non-limiting example of a limited number (less than all) of legacy control channels is that a component carrier may also be only configured with UE specific control channels. Signaling between network nodes enables configuring the network nodes (e.g., eNode Bs) to operate the extension carrier according to a desired one of the modes. Signaling over the radio interface between the network and a UE enables the UE to be aware of the configured mode of the extension carrier. This technology may be used independently for uplink and downlink component carriers.

Figure 3:
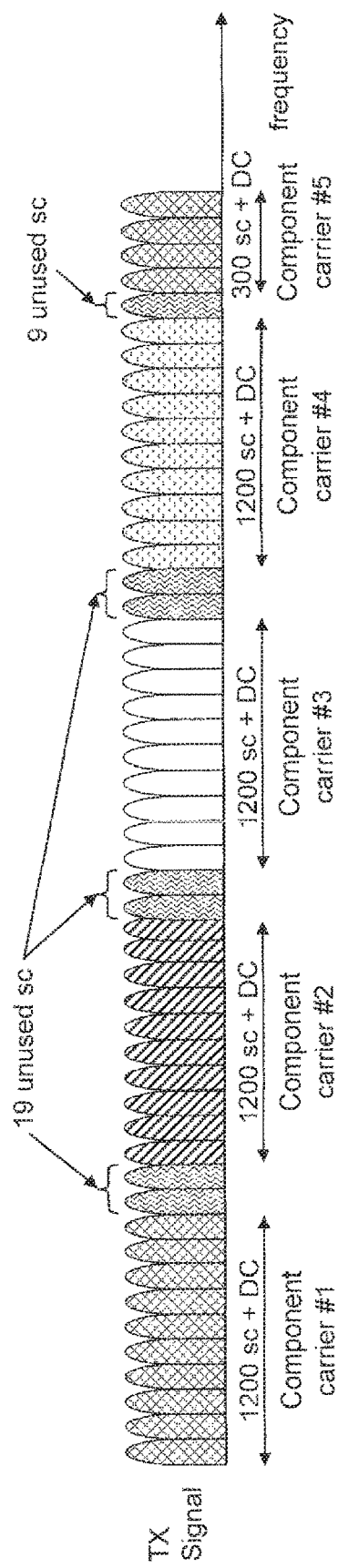
FIG. 3 illustrates a more detailed LTE aggregated carrier example.

Reference is now made to a non-limiting example in FIG. 3 which assumes that a contiguous spectrum block of greater than 20 MHz bandwidth is available in the LTE example. It is assumed or at least preferred for LTE that this spectrum is divided into a number of LTE-8 20 MHz component carriers plus one or more component carriers smaller than the LTE-8 20 MHz channel bandwidth. Each component carrier #1 to #4 includes 1200 sub-carriers (sc), where 1 sub-carrier=15 KHz. There are 19 unused sub-carriers between the component carriers #1 to #4 in order to maintain backward compatibility with the LTE-8 carrier of 20 MHz. Two "grid" conditions are required for LTE-A. First, release-8 of LTE requires that each component carrier center frequency be on a modulo-100 kHz "grid." Second, LTE-A envisions wider FFT systems so that all 40 MHz, for example, in a 2×20 MHz system can be processed jointly by the same fast Fourier transform (FFT). For this to work, each subcarrier needs to be on a modulo-15 kHz grid, which means that the distance between component carrier centers must be modulo-300 kHz. Packing "20+20" MHz as close together as possible while ensuring that all subcarriers are on 15 kHz and all DC-sub-centers for the components are on 100 kHz grid produces 100 RBs+19 SCs+100 RBs. In this example, there is one smaller component carrier of 5 MHz channel bandwidth comprising 300 sub-carriers. Fewer unused sub-carriers between component carrier #4 and #5 (9 unused sub-carriers in this case) are needed to maintain backward compatibility with LTE-8. This arrangement is applicable to both uplink and downlink as well as to LTE FDD and LTE TDD or to any OFDMA-based technology. Furthermore, the flexible carrier aggregation technology also applies to a non-contiguous carrier aggregation. In other words, the flexible carrier aggregation technology applies to any extension carrier used in any type of carrier aggregation: contiguous or non-contiguous.

Signaling is provided so that one or more extension carriers, e.g., relatively smaller component carriers, in an aggregated set of carriers may be dynamically configured in two or more modes of operations. The first mode supports an LTE-8 carrier with full lower layer signaling (i.e., with all control channels) to support legacy LTE-8 UEs. The second mode supports one or more LTE-10 extension carriers with data only resource blocks (i.e., without lower layer signaling or control channels) which are useable by LTE-10 UEs but not LTE-8 UEs. The third mode supports one or more LTE-10 extension carriers with limited control channels which are useable by LTE-10 UEs but not LTE-8 UEs.

The technology can be independently applied in different network nodes (e.g. eNode B) and also independently on different extension carriers. One of the benefits of this technology is that it provides considerable network flexibility in implementing an extension carrier according to one or more various factors and/or requirements, e.g., traffic load of legacy UEs which do not have carrier aggregation capability, number of legacy users, UE capability (e.g., in addition to LTE-8 UEs, not all LTE-10 UEs may support extension carriers depending on their capability), available bandwidth at the network, etc. If an operator has a smaller chunk of bandwidth in addition to the bandwidth of the normal component carriers then this extra bandwidth could be used for the extension carrier (e.g., an extension carrier can be used if total available BW is 80 MHz (4 normal carriers and one small 3-5 MHz extension carrier).

The lower layer signaling or control channels may include for example common channels such as a broadcast channel, a synchronization channel, and UE-specific channels such as a scheduling channel, a paging channel, an HARQ control channel, etc. Specific non-limiting examples of common control channels in LTE are the Physical Broadcast Channel (PBCH), the secondary synchronization signal (SSS) and the primary synchronization signal (PSS), which are transmitted in the downlink and Physical Random Access Channel (PRACH), which is transmitted in the uplink. In LTE, the master information block (MIB) is transmitted on the PBCH. However all system information blocks (SIBs) are transmitted on the physical downlink shared channel (PDSCH). Hence, the PDSCH containing SIBs or other information such as paging information is also considered a downlink common channel. Such a PDSCH is transmitted without HARQ. Specific non-limiting examples of UE-specific control channels in LTE are the physical hybrid ARQ indicator channel (PHICH), the physical downlink control channel (PDCCH), and the physical control format indicator channel (PCFICH) in the downlink and the physical uplink control channel (PUCCH) in the uplink. The data channels include the physical downlink shared channel (PDSCH) and the physical uplink shared channel (PUSCH) which are transmitted on the downlink and uplink, respectively.

The extension carriers, whether transmitted with or without control channels, must be configured by one or more network node(s). One example way to accomplish configuration is using a signaling scheme such as the non-limiting example shown in FIG. 5. An operator enters the carrier configuration data into a node capable of configuring a radio network node such as a base station and/or UE. In this example, such a node may be an Operating and Support System (OSS) node, an operation and maintenance (OAM) node, or a self organizing network (SON) node. The configuring node receives and stores the configuration data. The OSS or SON node configures the radio network node A (e.g., an eNode B (eNB)) according to any of the non-limiting options now described.

A first configuration option allows the radio network node A to transmit one or more component carriers either with all control channels or without any control channels. The configuration for each component carrier is preferably independent. The radio network node configures one or more component carriers as either legacy LTE-8 carriers with control channels or as LTE-10 extension carriers without control channels, assuming for illustration purposes only this particular dual mode operation. In this case, the OSS or SON node may selectively decide based on past network-related statistics. For instance, if statistics reveal the presence of a large number of legacy UEs in the network, then the OSS or SON node may configure the radio network node A to use one or more extension carriers with control channels. Another configuration decision factor may be the bandwidth of the extension carrier. An extension carrier with a larger channel bandwidth may for example be configured with control channels since the overhead associated with the control channels is smaller than it would be for a smaller bandwidth extension carrier.

A second option is to allow the radio network node to select for itself whether it should transmit one or more extension carriers with all control channels or without control channels, assuming for illustration purposes only this particular dual mode operation. The configuration for each extension carrier can be independent. This is a flexible approach from the radio network node's perspective because the radio network node can locally decide based on one or more predetermined factors or other criteria. In turn, the radio network node configures the component/extension carriers as either LTE-8 type carriers with control channels or as LTE-10 extension type carriers without control channels while taking into account one or more factors.

Several non-limiting example factors are now described. A first factor is a number of legacy UEs (i.e., non-carrier aggregation capable users) and their priority. For instance, if there is a large number of legacy UEs, then one or more extension carriers can be transmitted with control channels to accommodate as many legacy UEs as possible. A second example factor is how many carrier aggregation capable UEs can support extension carrier with or without control channels. An LTE-10 UE can, if capable, use extension carriers and LTE-8/9 only carriers. But an LTE-8/9 legacy UE can not use new carrier types, like extension carriers, unless upgraded. For example, a large number of carrier aggregation capable UEs may only be able to support extension carriers only with control channels because it is more challenging for such a UE to support transmission and reception without control channels. If this is the case, then the radio network node will configure the extension carrier to include control channels.

A third option is for the radio network node to determine whether the load of the legacy UEs is high rather than the number of legacy UEs as described in the first option. In other words, there might be few legacy users but their aggregate load may be quite high. If so, then the radio network node configures the extension carrier with control channels to accommodate the legacy UEs. This configuration option is supported by carrier aggregation capable UEs which can transmit and receive on the extension carrier with control channels. Operation with control channels is relatively easier for carrier aggregation capable UEs as compared to the case when no control channels are transmitted. This is because in an extension carrier without control channels, the UE typically must receive the control channel information (e.g., scheduling information) and data simultaneously increasing complexity. Accordingly, limited or selected control channels may be transmitted on one or more extension carriers. For example, the SSS, PSS, and PBCH are not transmitted, but UE-specific control channels such as PHICH and PDCCH are transmitted. In this example, information regarding UE-specific control channels, e.g., the number of OFDM symbols containing UE-specific channels, can be indicated to the UE via another component carrier such as via a primary or anchor carrier.

Another example embodiment for extension carrier configuration is to employ three modes of operations with regard to the control channel transmission on extension carriers. In the first mode, all control channels (e.g., all common and UE-specific control channels) are transmitted on one or more extension carriers. In the second mode, no control channels are transmitted on one or more extension carriers. In the third mode, a limited or selected number of control channels are transmitted on one or more extension carriers. As one non-limiting LTE example, the SSS, PSS, and PBCH are not transmitted on one or more extension carriers, but UE-specific control channels such as the PHICH and PDCCH are transmitted on one or more extension carriers. In this case, information regarding UE-specific control channels, e.g., the number of OFDM symbols containing UE-specific channels can be indicated to UEs via another component carrier such as via the LTE primary or anchor carrier.

Returning to FIG. 5, UEs signal their carrier aggregation capability to the radio network node supporting the cell in which the UE is being served. For UEs that can support carrier aggregation, the radio network node signals the extension carrier configuration information to those UEs. One signaling example is to send updated system information over a broadcast channel. Another example is to send the configuration information over a UE-specific channel at the time of a session is setup with the UE. The configuration information may also be sent during a session in case the configuration is modified. In principle, the mode of operation can be changed over a time scale in the order of few frames (1 frame=10 ms in LTE), and accordingly, the UE is preferably informed. But typically, the mode of operation is semi-static and is thus changed infrequently. Even in the semi-static case, it is desirable to inform new arriving UEs, (i.e., UEs entering a new cell in idle mode), by signaling the information of the current mode of operation on a regular basis, e.g., in a system information block (SIB), every few frames for example. A default mode can also be defined. For example, the first mode can be the default and is assumed by the UE in the absence of mode signaling.

The UE receives the configuration information and determines if a component carrier is a legacy LTE-8 carrier or an advanced LTE-10 extension carrier. The UE operates (i.e., receives and transmits) on the extension carrier accordingly based on that determination. In other words, the UE operation is adapted according to the configuration of the extension carrier. If the extension carrier does not contain any control channel, then the UE may receive and transmit on all resource blocks. On the other hand, the UE will not assume any data transmission and reception on resource blocks and OFDM symbols associated with control channels (as specified in the LTE-8 standard) in case the extension carrier is configured with control channels.

Figure 5:
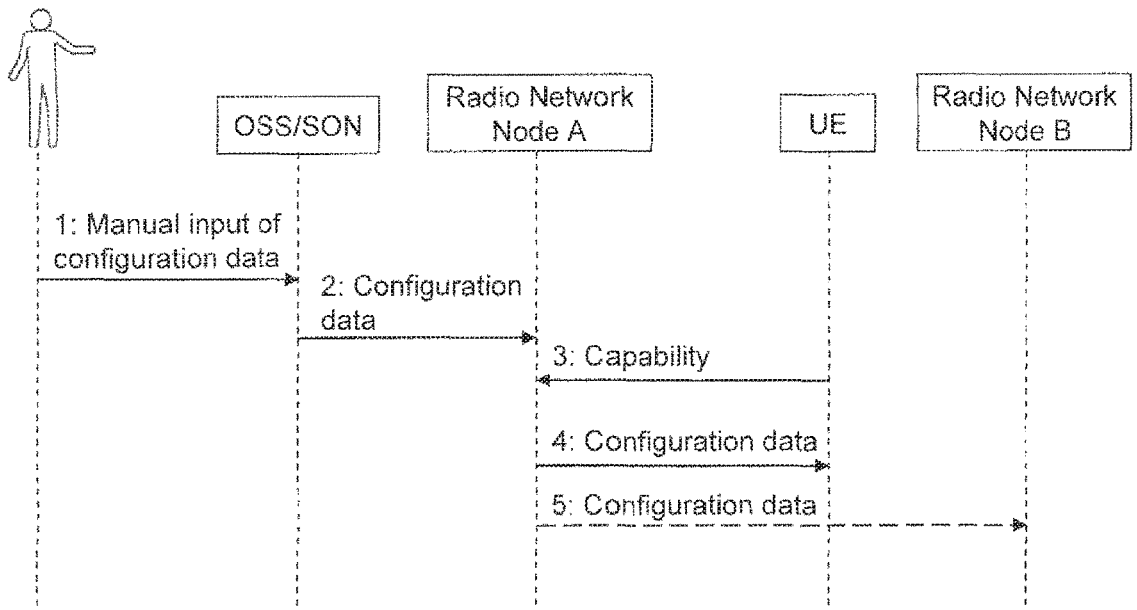
FIG. 5 is a signaling diagram illustrating non-limiting, example signaling for flexible carrier aggregation.

According to another example embodiment also shown in FIG. 5, the radio network node A also signals information related to the configuration of its extension carriers to other radio network nodes, e.g., radio network node B, over a radio network node interface. This can be used by the receiving radio network node B as input for certain radio resource management actions. For instance, this extension carrier configuration information can be used by radio network nodes in performing handover are compatible in terms of the configuration of the extension carrier.

Figure 6:
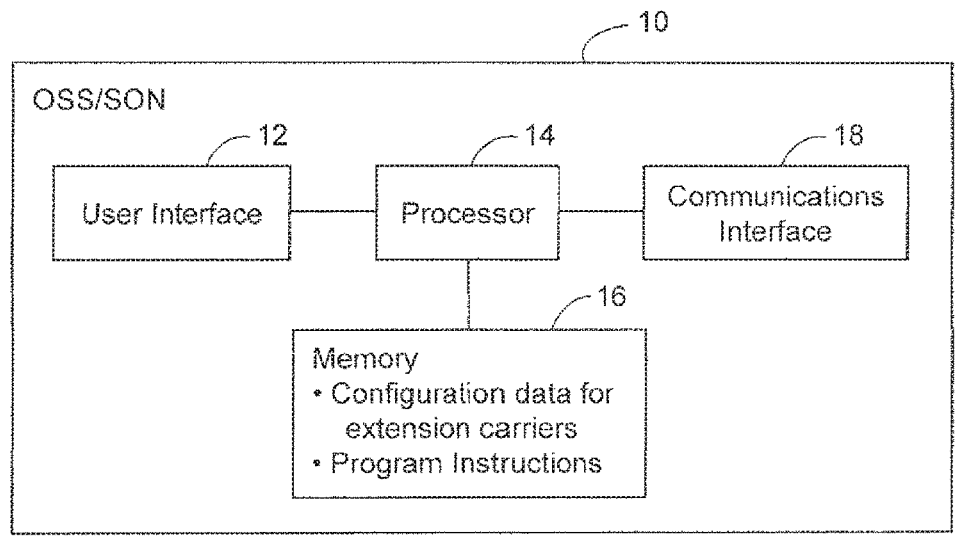
FIG. 6 is a non-limiting example function block diagram of an OSS/SON node.

FIG. 6 is a non-limiting example function block diagram of an OSS/SON node 10 that may be used to provide configuration data to radio network nodes. Node 10 includes a user interface 12 for receiving the initial carrier aggregation configuration information such as for example center frequency, number of resource blocks, type and configuration of signaling channels (including no signaling, just a part, or all), etc. A processor 14 receives and stores that carrier aggregation configuration information in a memory 16 which also includes suitable program instructions for controlling the operation of the processor 14. The processor 14 signals the carrier aggregation configuration information to one or more radio network nodes via a suitable communications interface 18 such as an eNodeB-OSS interface is called Mu1.

Figure 7:
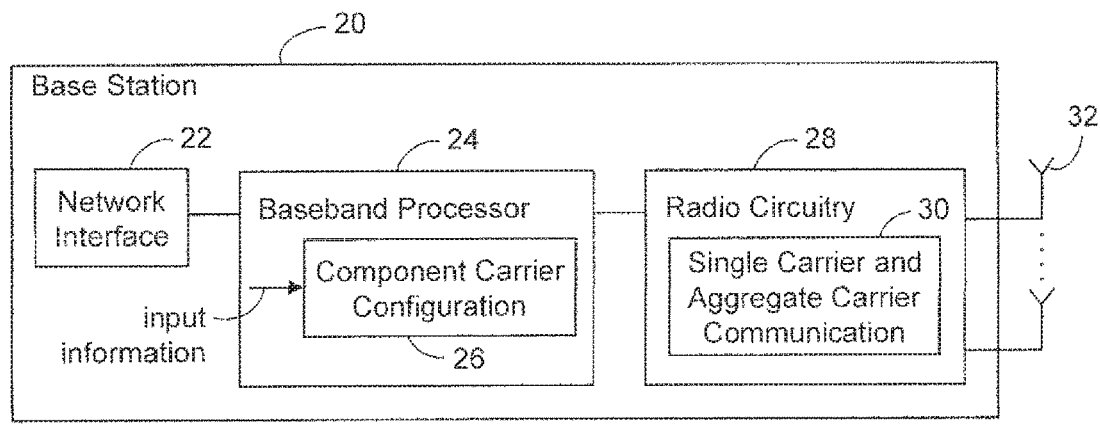
FIG. 7 is a non-limiting example function block diagram of a base station.

FIG. 7 is a non-limiting example function block diagram of a base station 20 which is an example radio network node. Base station 20 includes a network interface 22 for receiving the carrier aggregation configuration information from the OS S/SON node 10. A baseband processor 24 receives that carrier aggregation configuration information, stores it in a memory 26, and uses the configuration data to set up baseband processing of the channels and carriers defined, i.e., configuration/reconfiguration. No actual operational base band processing is done using the configuration data. The baseband processor 24 also includes suitable program instructions for controlling the operation of the baseband processor 24 to perform baseband processing operations required for aggregate carrier and single RF carrier communication in addition to those operations associated with carrier configuration. The baseband processor 24 provides the carrier configuration information to radio circuitry 28 which includes single carrier and aggregate carrier communication circuitry 30 for performing either single carrier communication or aggregate carrier communication via one or more antennas 32 and configuring each carrier in accordance with a selected mode of operation as described above. Optional input information (shown as an arrow) can be used to determine or select an appropriate carrier configuration. Examples of such input information, such as traffic load, statistical data, available bandwidth etc., were described above.

Figure 8:
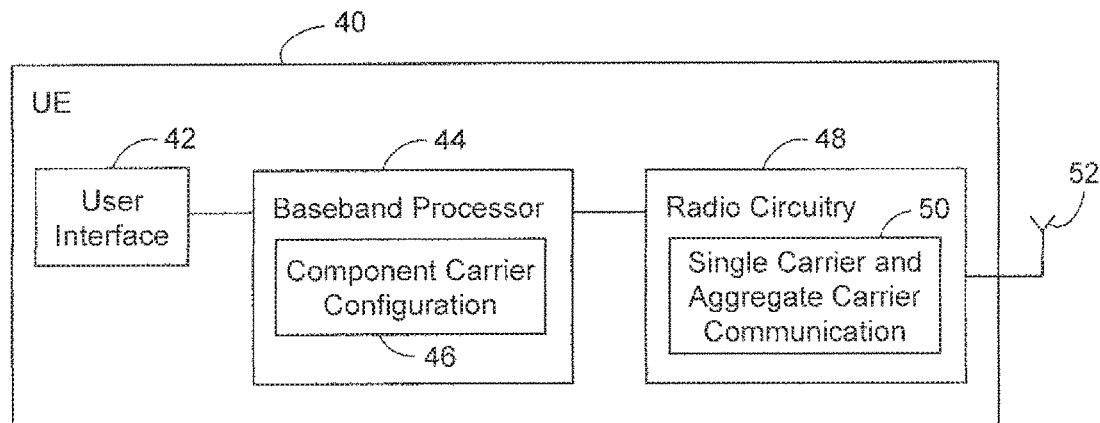
FIG. 8 is a non-limiting example function block diagram of a UE.

FIG. 8 is a non-limiting example function block diagram of a UE 40 that includes carrier aggregation capability, e.g., an LTE-10 UE. The UE 40 includes any suitable user interface 42 that allows a user to communicate with the radio network including display, microphone, speaker, data input, etc. The user interface 42 communicates with a baseband processor 44 that performs baseband processing operations required for aggregate carrier and single RF carrier communication in addition to those operations associated with carrier configuration. The baseband processor 44 communicates with radio circuitry 48 to transmit and receive radio signals using one or more antennas 52. The radio circuitry 48 includes a single carrier and aggregate carrier functionality 50 selectively used depending on the particular configuration of the carrier(s). The single carrier and aggregate carrier functionality 50 may provide the radio network node with its carrier communication capabilities as indicated in FIG. 5 and receives the current carrier configuration to be used by the UE 40 when communicating with the radio node and stores in a component carrier configuration memory 46.

The technology described here allows flexibility for network operators to configure new spectrum as component carriers. Each carrier can be configured to support legacy UEs by being backwards compatible (with a small penalty in user data transmission efficiency dues to signaling overhead) or to support new extension type carriers which are more efficient in terms of user data transmission but not backwards compatible. This is because an extension carrier carries either no signaling or only small amounts of signaling overhead. Again, while detailed examples were described in an LTE context, the technology may be applied in any system that supports aggregate carriers whether contiguous or non-contiguous.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described here, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A user equipment (UE), comprising:
a receiver configured to receive an information sent by a base station including a configuration of one or more of multiple radio frequency component carriers being used by the base station to communicate the information with the UE, wherein each of the multiple radio frequency component carriers being configurable with one or more control channels in a first mode of operation and with no control channels in a second mode of operation wherein the base station determines to communicate the information to the user equipment based on at least one of (a) a number of legacy user equipments that is to operate only in the first mode of operation, (b) a priority of the number of legacy user equipments, or (c) a capability of the user equipments being served by a radio network node, wherein the information is communicated to the user equipment using a UE-specific message: and processing circuitry configured to determine the configuration of at least one of the multiple radio frequency component carriers being used by the base station to communicate the information with the UE, wherein the configuration is determined based on a bandwidth of the at least one of the multiple radio frequency component carriers, and if the determined configuration is for the first mode of operation for the one multiple radio frequency component carrier, to prohibit transmitting on resource blocks for the one multiple radio frequency component carrier corresponding to a control channel, and if the determined configuration is for the second mode of operation for the one multiple radio frequency component carrier, to permit transmitting on all resource blocks for the one multiple radio frequency component carrier.

2. The UE of claim 1, wherein the information is transmitted to the UE with the one or more of multiple radio frequency component carriers configured with the one or more control channels or with no control channels.

3. The UE of claim 1, wherein the configuration for each of the multiple radio frequency component carriers is independent of the configuration of the others of the multiple radio frequency component carriers.

4. A non-transitory computer-readable medium, storing instructions thereon for, when executed by a processor, causing a user equipment (UE) to:
receive an information sent by a base station including a configuration of one or more of multiple radio frequency component carriers being used by the base station to communicate the information with the UE, wherein each of the multiple radio frequency component carriers being configurable with one or more control channels in a first mode of operation and with no control channels in a second mode of operation, wherein the base station determines to communicate the information to the user equipment based on at least one of (a) a number of legacy user equipments that is to operate only in the first mode of operation, (b) a priority of the number of legacy user equipments, or (c) a capability of the user equipments being served by a radio network node, wherein the information is communicated to the user equipment using a UE-specific message: and determine the configuration of at least one of the multiple radio frequency component carriers being used by the base station to communicate the information with the UE, wherein the configuration is determined based on a bandwidth of the at least one of the multiple radio frequency component carriers, and if the determined configuration is for the first mode of operation for the one multiple radio frequency component carrier, to prohibit transmitting on resource blocks for the one multiple radio frequency component carrier corresponding to a control channel, and if the determined configuration is for the second mode of operation for the one multiple radio frequency component carrier, to permit transmitting on all resource blocks for the one multiple radio frequency component carrier.

5. The non-transitory computer-readable medium of claim 4, wherein the information is transmitted to the UE with the one or more of multiple radio frequency component carriers configured with the one or more control channels or with no control channels.

6. The non-transitory computer-readable medium of claim 4, wherein the configuration for each of the multiple radio frequency component carriers is independent of the configuration of the others of the multiple radio frequency component carriers.

* * * * *